(12) United States Patent
Clark et al.

(10) Patent No.: US 7,359,088 B2
(45) Date of Patent: Apr. 15, 2008

(54) METHODS AND SYSTEMS FOR ESTIMATING SINGLE OR MULTI-COLOR TONER COVERAGE ON A PRINTER PAGE

(75) Inventors: Raymond E. Clark, Georgetown, KY (US); David K. Lane, Stamping Ground, KY (US); Cary P. Ravitz, Lexington, KY (US); Stanley C. Tungate, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 924 days.

(21) Appl. No.: 10/688,110

(22) Filed: Oct. 16, 2003

(65) Prior Publication Data
US 2005/0083541 A1    Apr. 21, 2005

(51) Int. Cl.
*H04N 1/52* (2006.01)
*H04N 1/56* (2006.01)

(52) U.S. Cl. .............. 358/1.9; 358/504; 358/536
(58) Field of Classification Search .............. 358/1.1, 358/1.9, 3.28, 501, 504, 401, 406; 347/5, 347/19, 115, 172, 232, 240, 251
See application file for complete search history.

(56) References Cited

U.S. PATENT DOCUMENTS

| 5,349,377 | A |   | 9/1994  | Gilliland et al. |
| 5,515,479 | A | * | 5/1996  | Klassen ............ 358/1.9 |
| 5,592,298 | A |   | 1/1997  | Caruso |
| 5,604,578 | A |   | 2/1997  | Shibuya et al. |
| 5,825,986 | A | * | 10/1998 | Ferguson .......... 358/1.9 |
| 5,937,225 | A |   | 8/1999  | Samuels |
| 6,160,970 | A |   | 12/2000 | Scheuer et al. |
| 6,160,971 | A |   | 12/2000 | Scheuer et al. |
| 6,167,213 | A |   | 12/2000 | Buranicz et al. |
| 6,167,214 | A |   | 12/2000 | Scheuer et al. |
| 6,169,861 | B1 |   | 1/2001  | Hamby et al. |
| 6,173,133 | B1 |   | 1/2001  | Donaldson et al. |
| 6,175,698 | B1 |   | 1/2001  | Scheuer et al. |
| 6,356,359 | B1 |   | 3/2002  | Motamed |
| 6,456,802 | B1 |   | 9/2002  | Phillips |
| 2002/0141765 | A1 |   | 10/2002 | Phillips |

* cited by examiner

*Primary Examiner*—Thomas D. Lee
(74) *Attorney, Agent, or Firm*—Geoffrey L. Oberhaus (57) ABSTRACT

Methods and systems for estimating single or multi-colored toner coverage on a printed page. One method includes generating color plane bitmaps corresponding to each color in a contone bitmap and calculating pixel coverage values for each of the color plane contone bitmaps. Another method includes receiving image data to be printed, generating color separations for the image data corresponding to available toner colors, printing each color separation on a printed page, scanning each printed page comprising the color separation and calculating toner coverage on each of the scanned printed pages.

24 Claims, 8 Drawing Sheets

METHODS AND SYSTEMS FOR ESTIMATING SINGLE OR MULTI-COLOR TONER COVERAGE ON A PRINTER PAGE

FIELD OF THE INVENTION

Embodiments of the present invention relate generally to methods and systems for estimating toner coverage on a printed page, and more specifically, to methods and systems for calculating estimated pixel coverage values for single or multi-color toner coverage on a printed page.

BACKGROUND OF THE INVENTION

Users of printers desire the ability to estimate their cost of printing. One important factor is toner usage. Printer manufacturers typically estimate printed page cost based on a rough estimate of five percent toner coverage across a page. While this estimate can provide a comparison of the relevant costs of printing an image between different printers, the actual toner coverage between different printed pages can vary significantly from printer manufacturers' estimates. Therefore, the actual cost for a printed page can vary significantly for different print jobs. As such, there is a need to provide a method and apparatus to estimate toner usage for print jobs based on the image data from each job.

The number of toners used in print engines typically varies from one toner (monochrome printing) to four toners (cyan, magenta, yellow, and black) (commonly referred to as CMYK) to even six or more toners. The cost of consumables and printing processes can be significant, particularly for many color printers that use advanced toners or application techniques, such as for inkjet, thermal wax transfer or dye sublimation printers.

Printers typically receive PostScript™ and Printer Command Language (PCL) print jobs from an external device. These print jobs may include characters, regions of uniform color, 24 bit Red-Green-Blue (RGB) images and other object types. The raster image processor (RIP) in the printer scales these objects to device resolution (often 600 dots per inch), renders a bitmap at device bitdepth with the appropriate halftone screen and delivers the resulting bitmap to the print engine. The print engine generates commands to release toner upon a substrate to print a printed image, based upon the rendered bitmap of the page image. Toner is deposited and fixed onto the substrate, in a proportion relevant to the specified percentages of toner colors in the print job.

SUMMARY OF THE INVENTION

One embodiment of the present invention is the method for estimating single or multi-color toner coverage on a printed page. The method comprises receiving image data to be printed; converting the image data to a contone bitmap; generating color plane contone bitmaps corresponding to each toner color in the contone bitmap; calculating pixel coverage value for each of the color plane contone bitmaps; copying the calculated pixel coverage values onto the color plane contone bitmaps; rendering bitmaps at device resolution and bitdepth with an appropriate halftone screen corresponding to the color plane contone bitmaps; and printing the rendered bitmaps to generate a printed page, wherein the printed page includes the calculated pixel coverage values.

Another embodiment of the present invention is a method for estimating single or multi-color toner coverage on a printed page. The method comprises receiving image data to be printed; generating color separations for the image data corresponding to available toner colors; printing each color separation on a separate page; scanning each printed page comprising the color separations; and calculating toner coverage on each of the scanned printed pages.

Another embodiment of the present invention is a system for estimating toner coverage on a printed page. The system comprises a printing apparatus; an image reading apparatus; wherein the printing apparatus is configured to generate color separations for an image to be printed, and wherein the color separations correspond to the available toner colors, and further wherein the printing apparatus is configured to print each color separation on a separate page; and wherein the image reading apparatus is configured to scan each printed color separation and calculate toner coverage.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION

Reference will now be made in detail to various embodiments of the invention, examples of which are illustrated in the accompanying drawings, wherein like numerals indicate similar elements throughout the views.

As used herein, "printer," "printer device" or the like, means any electronic device having data communications, data storage capabilities, and/or functions to render printed characters and images on a print media. A printer device may be a printer, fax machine, copier, plotter, and the like. The term "printer" includes any type of printing device using a transferred imaging medium, such as ejected ink, to create an image on a print media. Examples of such a printer can include, but are not limited to, laser printers, inkjet printers, plotters, portable printing devices, as well as multi-function combination devices.

Figure 1:
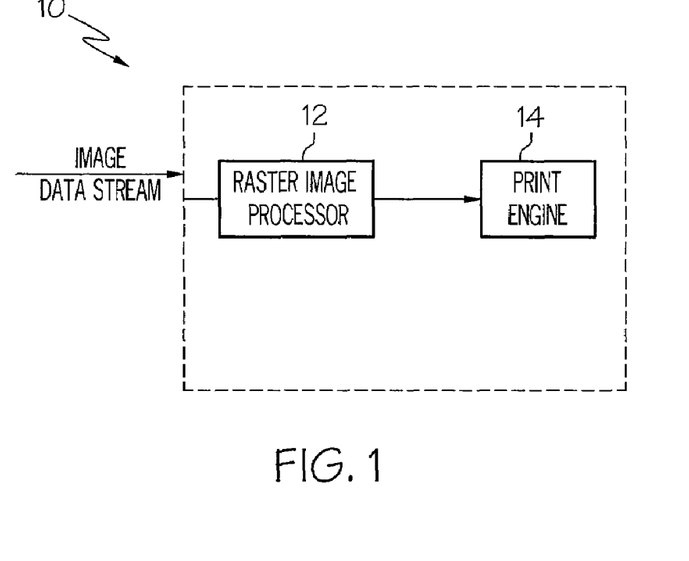
FIG. 1 is a schematic illustration of an exemplary printer processor.

A typical printer 10 image processing system is depicted in FIG. 1. The printer 10 receives an image datastream from another device such as a camera or computer and the raster image processor (RIP) 12 processes the received image datastream and generates the print commands for the print engine 14. The print engine 14 receives the print commands from the RIP 12 and generates a printed page.

Figure 2:
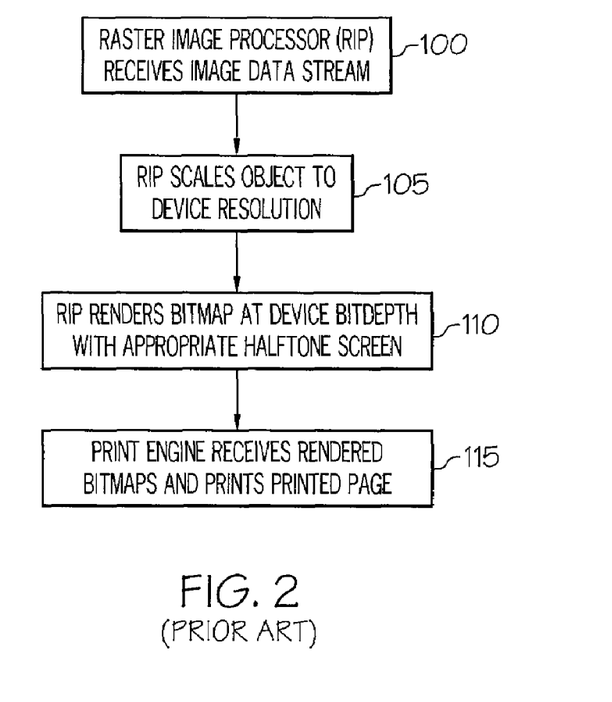
FIG. 2 is a flow diagram of an exemplary method of printing known to one skilled in the art.

FIG. 2 illustrates a typical method known to one skilled in the art for a multi-color printer to generate a printed page. The raster image processor (RIP) receives the image datastream 100 from a computer or other source. The RIP scales the object to device resolution 105. For example, in one instance, the printer (device) resolution is 600 dots per inch. The RIP renders bitmaps at device resolution and bitdepth with the appropriate halftone screen 110. The resulting rendered bitmaps are utilized by the print engine which generates print code and prints the printed page 115.

Figure 3:
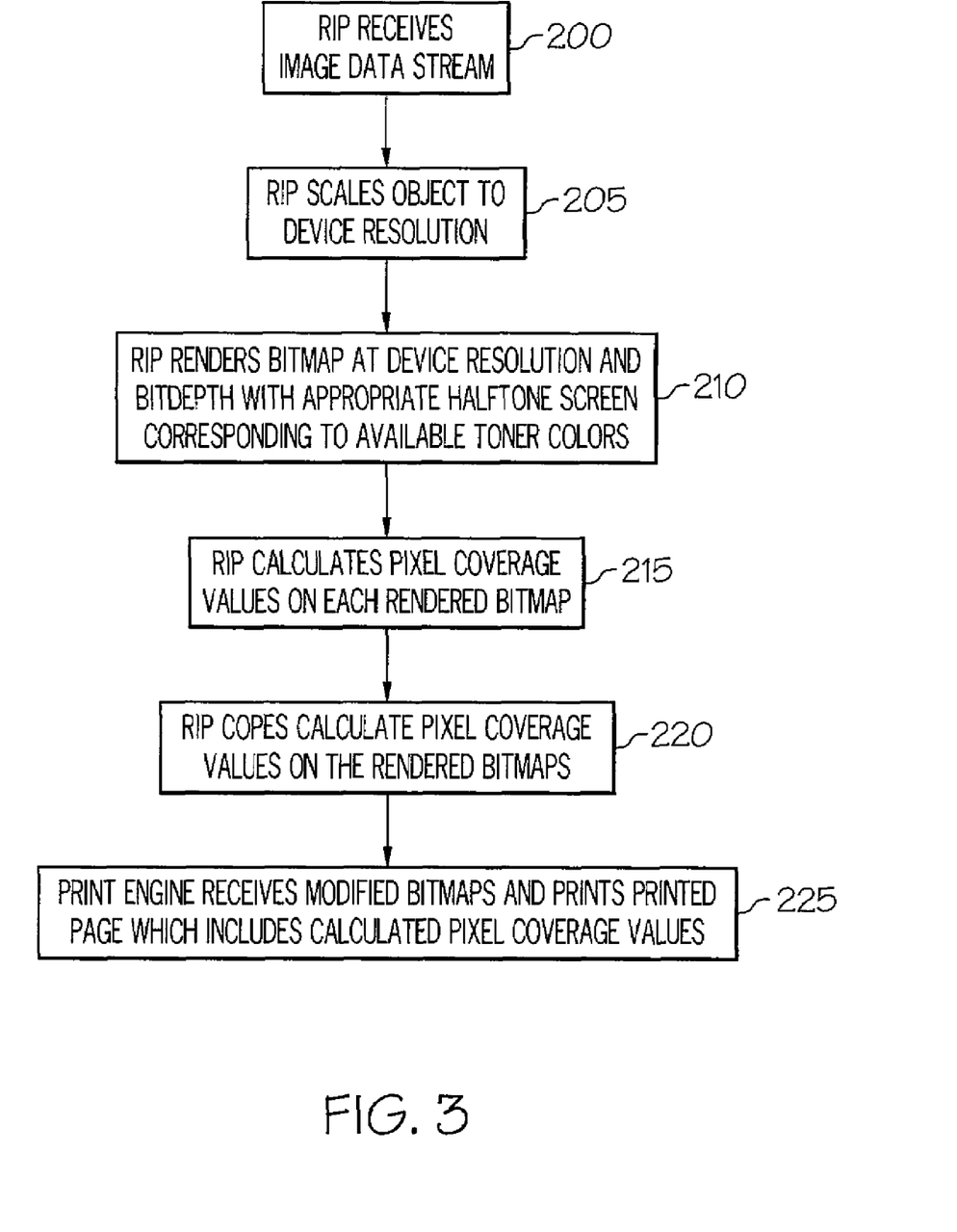
FIG. 3 is a flow diagram of an exemplary method according to an embodiment of the present invention.

One embodiment of the invention is depicted in FIG. 3. FIG. 3 illustrates an exemplary method for estimating multi-color toner coverage on a printed page. The RIP of the printer receives the image datastream from the originating source, such as a computer 200. The RIP scales the object to device resolution 205. The RIP renders bitmaps at device resolution and bitdepth with the appropriate halftone screen corresponding to the available toner colors on the printer 210. The RIP calculates pixel coverage values on each rendered bitmap 215. The RIP copies the calculated pixel coverage values onto the rendered bitmaps 220. The print engine receives the modified bitmaps containing the calculated pixel coverage and prints a printed page which includes the calculated pixel coverage values 225.

In another embodiment of the present invention, before the rendered bitmap at device resolution and bitdepth is delivered to the print engine, the printer determines if a user has requested toner coverage calculations. If the user has requested toner calculation coverage, the RIP calculates pixel values and computes an average. This calculation is done for each color plane on the rendered bitmap. In one embodiment, the RIP can consider partial pixels in its calculation of the halftone screens. For example, the halftone screens that may render multi-bit pixels, each pixel may have a value of "off", "on" or "partially on". When a printer utilize four bits for each pixel, this can provide up to 16 levels per pixel and 65,536 possible colors in a four plane system. Other printers may only offer three levels per plane. The RIP utilizes the multi-bit configuration and weighs the various pixel values.

While the exemplary embodiments of the present invention disclose a four color plane (CMYK) printer, one skilled in the art will appreciate that the present invention can be utilized on other multi-plane printers such as six color plane or even eight color plane printers.

Figure 4:
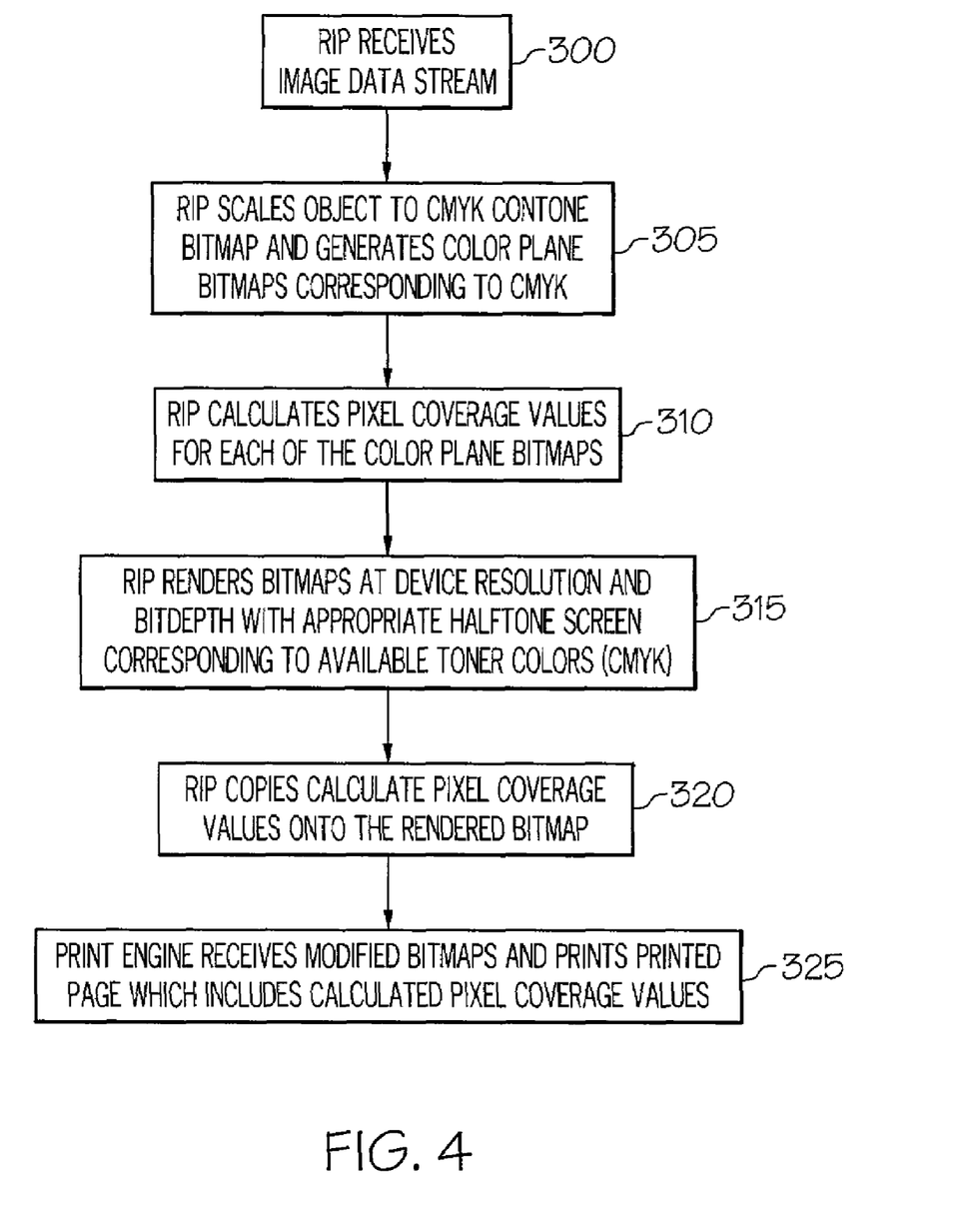
FIG. 4 is a flow diagram of an exemplary method according to another embodiment of the present invention.

Another embodiment of the present invention is depicted in FIG. 4. FIG. 4 illustrates an exemplary method for estimating multi-color toner coverage on a printed page. This embodiment utilizes contone color plane bitmaps to calculate estimated toner coverage on a printed page. The method comprises the RIP receiving the image datastream from the computer or other device 300. The RIP scales the object to a CMYK contone bitmap and generates color plane bitmaps corresponding to CMYK 305. The RIP calculates pixel coverage values for each of the color plane bitmaps 310. The RIP renders bitmaps at device resolution and bitdepth with the appropriate halftone screen corresponding to the available toner colors (e.g. CMYK) 315. The RIP then copies the calculated pixel coverage values onto the rendered bitmaps 320. The print engine receives the modified bitmaps and prints a printed page which includes the calculated pixel coverage values 325.

Typically, the incoming objects in the image datastream are 24 bit red/green/blue (RGB colors). On a four color plane printer, the RIP converts the incoming datastream to a 32 bit cyan/magenta/yellow/black (CMYK) color space. Once the colors have been converted to a CMYK color space, the bitmap is then rendered on four color planes with eight bits per pixel on each plane. Once the contone bitmap at 32 bits per pixel is generated, the toner coverage estimate can be performed. In one embodiment, the contone bitmap does not have to be rendered at device resolution. In order to generate only a coverage analysis, the contone bitmap can be at a resolution less than device resolution such as 150 pixels per inch (ppi) or lower. This allows the RIP to work with the contone bitmaps much easier due to the reduced amount of memory taken up by the reduced resolution bitmap. For example, at 600 ppi, a standard letter (8.5×11) sized contone image can consume over 128 MB of memory, whereas at a lower resolution such as 150 ppi, the memory consumption is reduced to 8 MB.

Figure 5:
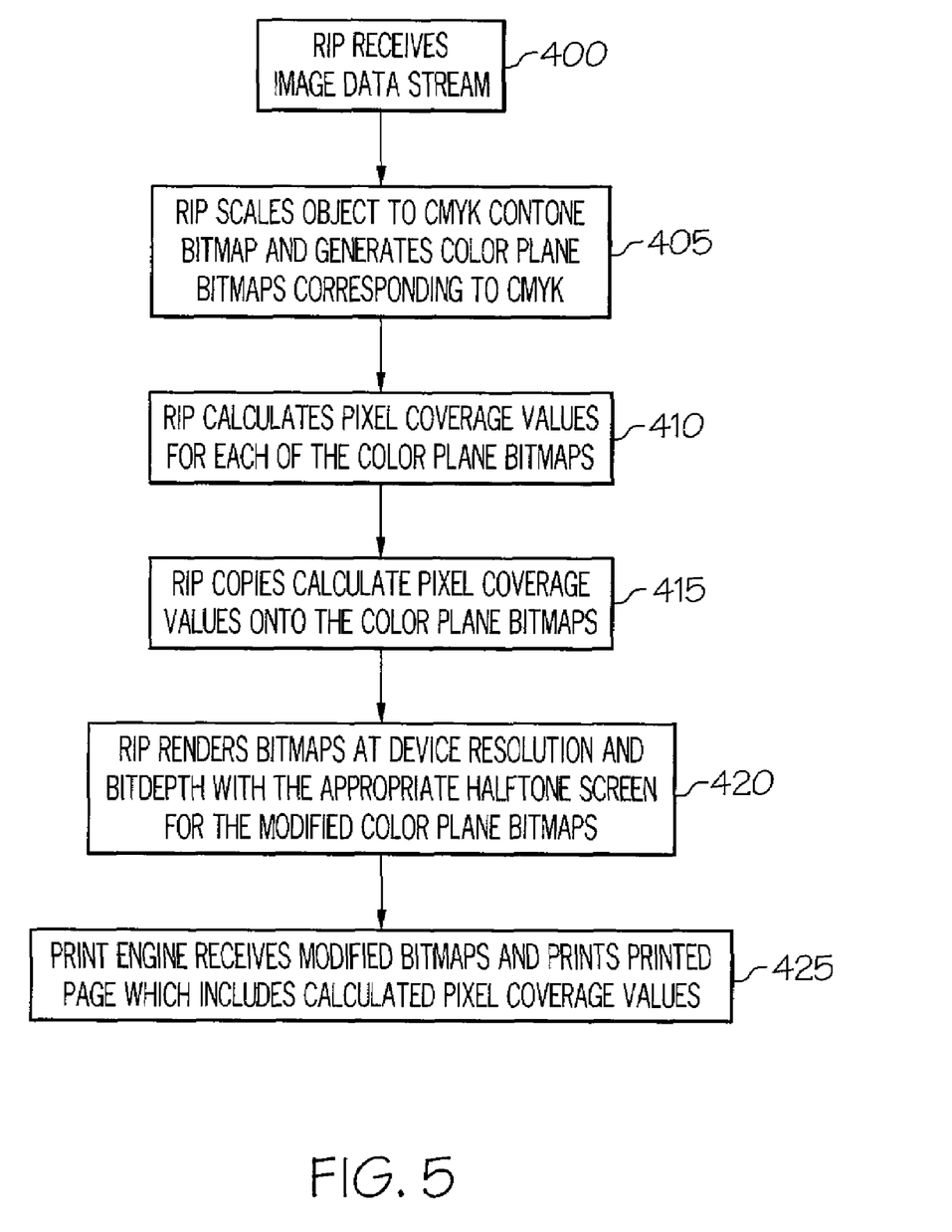
FIG. 5 is a flow diagram of an exemplary method according to another embodiment of the present invention.

Another embodiment of the present invention is depicted in FIG. 5. FIG. 5 illustrates an exemplary method for estimating multi-color toner coverage on a printed page. The method comprises: the RIP receiving an image datastream from another source such as a computer 400; the RIP scales the object to a CMYK contone bitmap and generates color plane bitmaps corresponding to CMYK 405; the RIP calculates pixel coverage values for each of the color plane bitmaps 410; the RIP copies the calculated pixel coverage values onto the color plane bitmaps 415; the RIP renders bitmaps at device resolution and bitdepth with the appropriate halftone screen corresponding to available toner colors (CMYK) 420; and the print engine receives the rendered bitmaps and prints a printed page which includes the calculated pixel coverage values 425.

Since the shade level generation of laser and led printers is non-linear, i.e. the shade level output to paper is not a linear function of the shade level generated on the photoconductive drum, counting laser or led pulses is not a good predictor of toner usage. Counting toner metering cycles may be accurate for the long term but cannot give a good instantaneous reading of toner usage. However, the input shade level (as specified by the input printer control language) is reasonably linear in output toner because the nonlinearity in the hardware is compensated by the software in order to give accurate images. The input shade level can be mapped to give the correct output L*, which is not the same as toner coverage, but result in a much closer correlation than laser or led pulses.

In one exemplary embodiment, summing input coverage times shade level (after color correction) can yield an accurate indication of toner usage. This can be used to predict toner condition for reflectivity measurements, development compensation, or reconditioning processes. It can also be used to predict toner cartridge life.

In addition, several techniques can be used to make this prediction even more accurate. First, one could apply an L* to coverage conversion. This can be derived empirically by measuring L* versus coverage using low frequency screens, which are, by nature, linear in coverage. Second one can empirically derive a map of transfer efficiency versus coverage and account for this in the summing. If the printing process includes back transfer to other color stations and/or a second transfer step, these can be accounted for also. For back transfer and second transfer, this is likely a function of color and shade level, so the mapping may be more complex.

One exemplary functional form for a monochrome laser printer can be expressed as:

toner usage=sum over image ($L^*$_to_area(shade level)/transfer_efficency(shade_level))*m/a where $L^*$_to_area is the mapping function from input shade level to percent coverage;

transfer_efficiency is the toner transferred to paper divided by the toner developed to the photoconductive drum as a function of input shade level; and m/a is the mass per unit area of the toner on paper.

For a four color (C, M, Y, K) tandem direct to paper printer one could modify this formula to account for back transfer as a function of input color level for each color plane. Typically, each image color will have a different back transfer function because it is composed of screened single and multilayer primary colors, where back transfer typically acts only on the toner layer closest to the PC drum. Each color plane has a different set of PC drums to which it can back transfer.

One exemplary function form would be:

toner usage for color plane $C$=sum over image ($L^*$_to_area(shade_level_$C$)/back_transfer_efficiency(image_color, shade_level_$C$)transfer_efficency(shade_level_$C$))*m/a where back_transfer_efficiency(image_color, shade_level_C) is the fractional toner remaining on the paper after all back transfer stations for color plane C.

With this method it may be possible to more accurately predict end of cartridge life for systems without a toner metering system. In addition, software external to the printer would be able to predict toner consumption more accurately.

Figure 6:
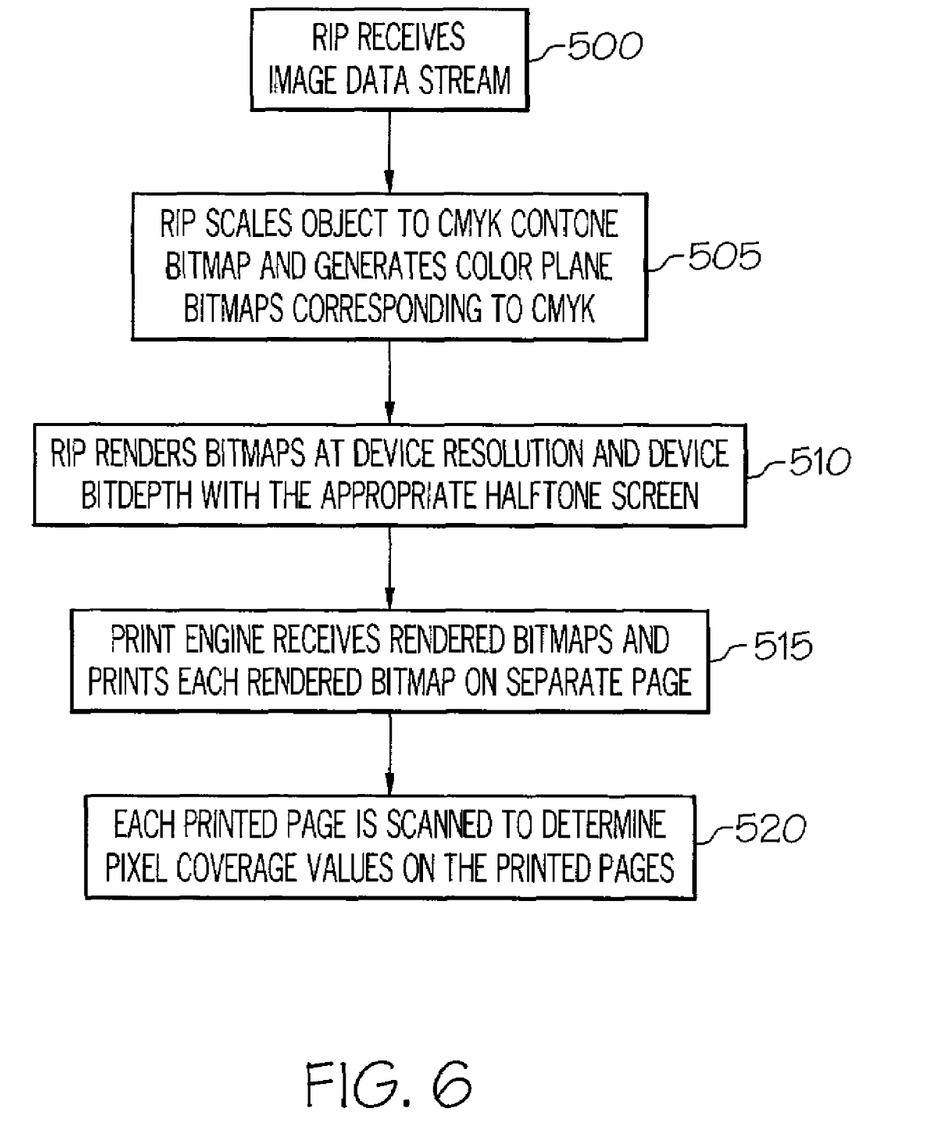
FIG. 6 is a flow diagram of an exemplary method according to another embodiment of the present invention.

Yet another embodiment of the present invention is depicted in FIG. 6. FIG. 6 illustrates a method for estimating toner coverage on a printed page utilizing a scanner. The method comprises: the RIP receiving an image datastream from another source, such as a computer 500; the RIP scales the object to a CMYK contone bitmap and generates a color plane bitmap corresponded to CMYK 505; the RIP renders bitmaps at device resolution and bitdepth with the appropriate halftone screen for each of the color plane bitmaps 510; the print engine receives the rendered bitmaps and prints each rendered bitmap on a separate page 515; and each printed page is scanned to determine the pixel coverage values on the printed page 520. In one exemplary embodiment, the first printed page contains the cyan plane, the second page contains the magenta plane, the third page contains the yellow plane and the fourth sheet contains the black plane. With a separation for each plane, the pages can be scanned and processed individually. One exemplary method of scanning to determine pixel coverage values comprises scanning the page as a RGB image and extracting the complimentary color plane. For example, the blue plane should be isolated and saved when a yellow source is scanned.

In another embodiment of the present invention, all four planes corresponding to the CMYK color planes could be printed with black toner. This allows scanning a gray image from a black source which allows easier calculation and processing. In this embodiment, each bitmap could be rendered utilizing the appropriate halftone screen for the respective CMYK color, but the print engine would only utilize black toner to actually print the cyan, magenta, yellow and black bitmaps. As one skilled in the art will appreciate, any of the four halftone screens can be utilized as each is nominally linear.

Figure 9:
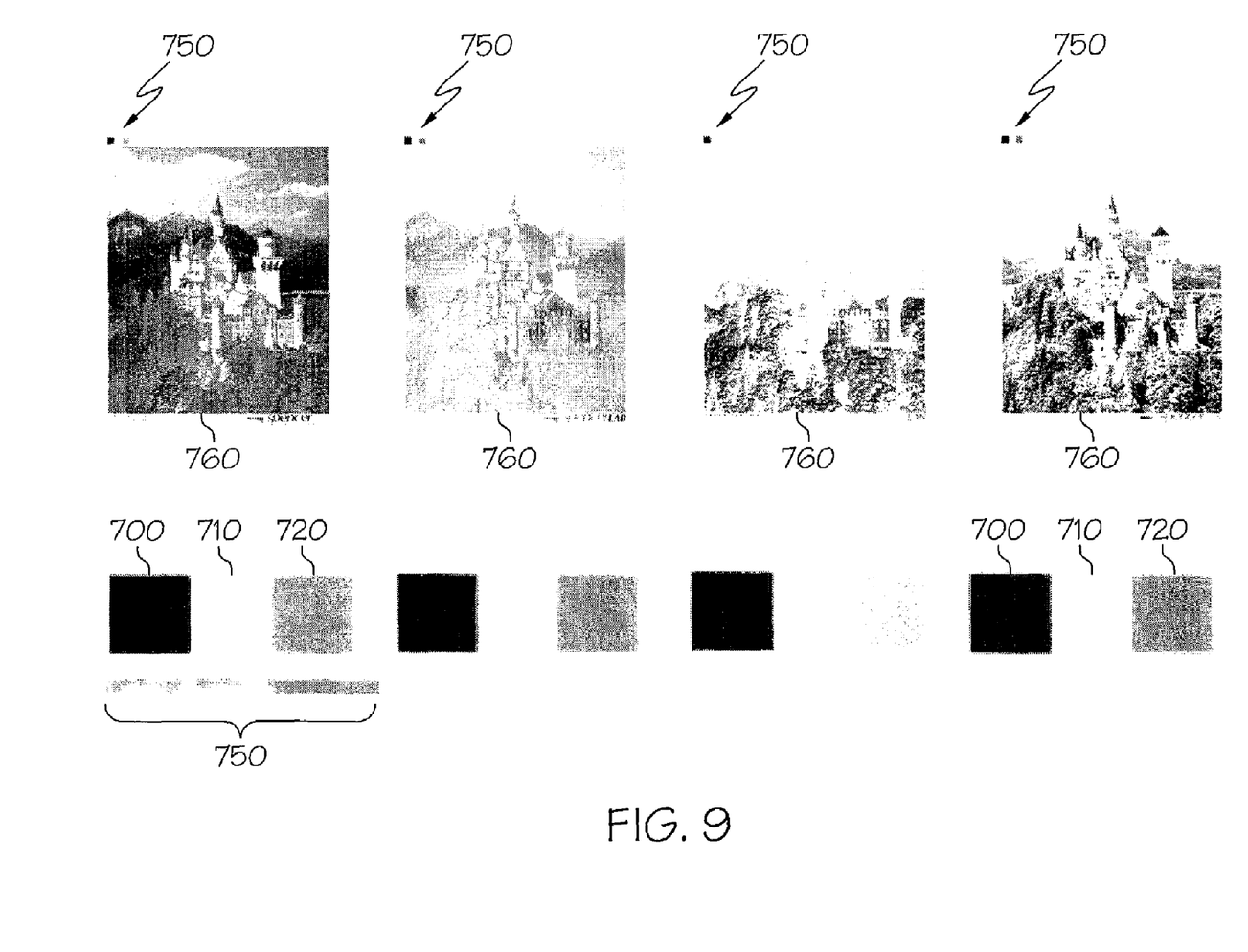
FIG. 9 is a schematic illustration of exemplary calibration marks according to one embodiment of the present invention.

In a further embodiment, calibration marks may be placed on the rendered bitmaps to calibrate differences between scanners. For example, a calibration mark can be embedded in each image which permits the scanner to operate in its nominal configuration. Software could then locate the calibration marks and utilizing an image processing utility and adjust the scanned image. For example, as depicted in FIG. 9 in one embodiment, the calibration marks 750 could comprise drawing a small region of one hundred percent coverage 700, zero percent coverage 710 and fifty percent coverage 720 on each of the CMYK separations 760. The one hundred percent coverage square 700, can be utilized by the image processing utility as a key to locate the two lighter regions (710 and 720). The image processing utility then can sample each region numerous times and calculate an average gray level for each coverage value. In an ideal world, the coverage values would measure as 0, 128 and 255 on a scale of 0 to 255. However, due to differences and inaccuracies by scanners, deviations from such results can be expected. To compensate for this variation, a gamma function can be derived.

Gamma=log(128.0/255)/log((*avgGRAY-avg-WHITE)/*avgBLACK)

Comp. value=(int) (pow)((value-*avgWHITE)/*avg-BLACK,*gamma)*255)

In one embodiment, a 255 member table can be constructed to quickly provide a compensation value for variation in the scanned image. This compensation value allows to provide a more accurate toner coverage estimate. In another embodiment, a quadratic curve can be fitted with three points to give enhanced coverage estimates as well. As one skilled in the art will appreciate, various calibration techniques can be utilized to calibrate the scanners. In one embodiment, to enhance calibration, the calibration marks are printed with black toner but the region of fifty percent coverage is rendered with the original halftone screen for each color. For example, the yellow region should be rendered with the yellow halftone screen. Once the four separations have been scanned and calibrated, an average gray level can be calculated for each plane. These values are approximations of the toner usage.

Approx. toner usage=average gray level=(sum of adjusted pixel values)/total pixels.

In a further embodiment, a graphical application running on a computer can perform these calculations from the scanned image bitmaps generated by a scanner. As shown in an exemplary illustration in FIG. 7, the resulting average gray level 800 is displayed on the application banner 810. The average white region value 815, average gray region value 820, average black region value 830, and resulting gamma value 840 are also displayed.

Figure 7:
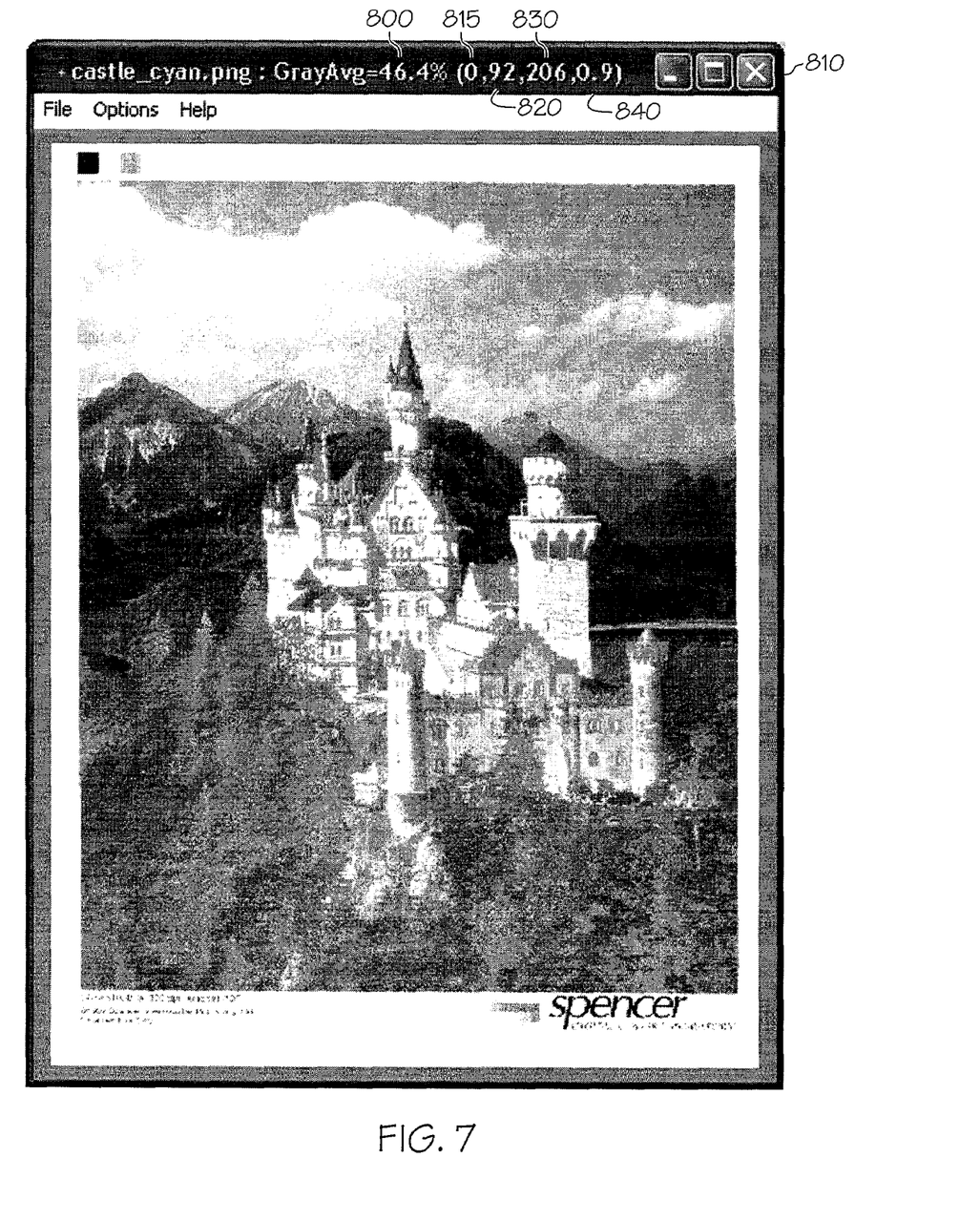
FIG. 7 is a schematic illustration of an exemplary screenshot from a graphical image processing software according to one embodiment of the present invention.
Figure 8:
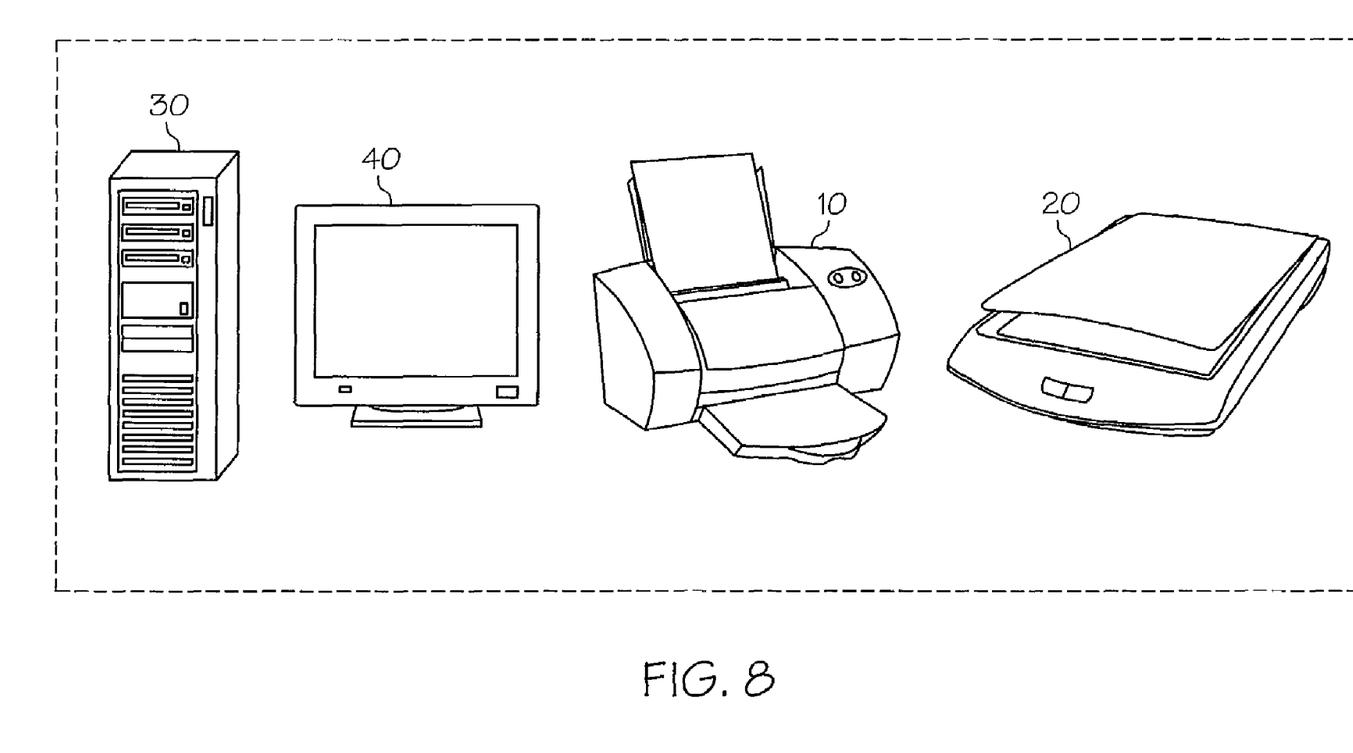
FIG. 8 is a schematic illustration of an exemplary system according to one embodiment of the present invention.

Another embodiment of the invention is depicted in FIG. 8. FIG. 8 illustrates an exemplary system for estimating toner coverage on a printed page. The system comprises a printing apparatus 10 and an image reading apparatus 20. The printing apparatus 10 is configured to generate color separations for an image to be printed, wherein the color separations correspond to the available toner colors of the printer 10 and further wherein the printing apparatus 10 is configured to print each color separation on a separate page. The image reading apparatus 20 is configured to scan each color separation and calculate toner coverage. In a further embodiment, the system comprises a computer 30 and a graphic display unit 40. When the image reading apparatus 20 scans the printed color separation, a file may be generated and stored on computer-readable medium in the computer 30. An application on the computer, such as an image processing program, can then analyze the saved bitmap file corresponding to the scanned color separation and generate the average gray level for the scanned bitmap as well as the average white region value, average gray region value, average black region value, and gamma value as illustrated in FIG. 7. As will be appreciated by one skilled in the art, the image reading apparatus 20 may contain the necessary instructions and processing capability to calculate the average gray level and determine an estimate of the toner coverage. Alternatively, an external computer 30 or other processing device may comprise such instructions and processing capabilities to read and calculate from a bitmap file generated by the image scanning apparatus 20 the average gray value levels.

Another aspect of the present invention is a computer data signal embodied in the carrier wave and representing sequences of instructions which, when executed by a processor, control a multi-color printer for estimating multi-color toner coverage on a printed page, by the following act: receiving image data to be printed; rendering bitmaps at device resolution and bitdepth with the appropriate halftone screen corresponding to available toner colors; calculating pixel coverage values for each of the rendered bitmaps; copying the calculated pixel values onto the bitmaps; and printing the bitmaps to generate a printed page, wherein the printed page includes the calculated pixel coverage values.

Another aspect of the present invention is a computer program product. The computer program product comprises a computer usable medium having computer readable code embodied therein capable of controlling a multi-toner printer for estimating multi-color toner coverage on a printed page, comprising: a code portion configured to send instructions to receive an image data to be printed; a code portion configured to render bitmaps at device resolution and bitdepth with an appropriate halftone screen corresponding to available toner colors; a code portion configured to calculate pixel coverage values for each of the rendered bitmaps; a code portion configured to copy the calculated pixel coverage value onto the bitmaps; and a code portion configured to print the bitmaps to generate a printed page, wherein the printed page includes the calculated pixel coverage values.

The foregoing description of the various embodiments of the invention has been presented for the purposes of illustration and description. It is not intended to be exhaustive or limit the invention to the precise form disclosed. Many alternatives, modifications, and variations will be apparent to those skilled in the art of the above teaching. Accordingly, this invention is intended to embrace all alternatives, modifications and variations that have been discussed herein, and others that fall within the spirit and broad scope of the claims.

We claim:

1. A method for estimating single or multi-color toner coverage on a printed page, comprising:
    receiving image data to be printed;
    converting the image data to a contone bitmap;
    generating color plane contone bitmaps corresponding to each toner color in the contone bitmap;
    calculating pixel coverage value for each of the color plane contone bitmaps;
    rendering bitmaps with an appropriate halftone screen corresponding to available toner colors for each color plane contone bitmap;
    copying the calculated pixel coverage values onto the rendered bitmaps; and
    printing the rendered bitmaps to generate a printed page, wherein the printed page includes the calculated pixel coverage values.

2. The method of claim 1, wherein calculating pixel coverage value comprises compensating for toner waste.

3. The method of claim 1, wherein the contone bitmap resolution is less than device resolution.

4. A method for estimating single or multi-color toner coverage on a printed page, comprising:
    receiving image data to be printed;
    converting the image data to a contone bitmap;
    generating color plane contone bitmaps corresponding to each toner color in the contone bitmap;
    calculating pixel coverage value for each of the color plane contone bitmaps;
    copying the calculated pixel coverage values onto the color plane contone bitmaps;
    rendering bitmaps at device resolution and bitdepth with an appropriate halftone screen corresponding to available toner colors for each color plane contone bitmap; and
    printing the rendered bitmaps to generate a printed page, wherein the printed page includes the calculated pixel coverage values.

5. The method of claim 4, wherein calculating pixel coverage value comprises compensating for toner waste.

6. The method of claim 4, wherein the contone bitmap resolution is less than device resolution.

7. A method for estimating single or multi-color toner coverage on a printed page, comprising:
    receiving image data to be printed;
    generating color separations for the image data corresponding to available toner colors;
    printing each color separation on a separate page;
    scanning each printed page comprising the color separations;
    calculating toner coverage on each of the scanned printed pages.

8. The method of claim 7, wherein each printed color separation is printed utilizing black toner.

9. The method of claim 8, wherein each color separation is printed utilizes a halftone screen corresponding to the color separation.

10. The method of claim 7, wherein the color separations comprise cyan (C), magenta (M), yellow (Y) and black (K).

11. The method of claim 7, further comprising generating calibration marks on each of the color separations/printed pages.

12. The method of claim 11, wherein the calibration marks comprise patches corresponding to 100% coverage, 50% coverage and 0% coverage.

13. The method of claim 12, wherein the patch corresponding to the 50% coverage is generated utilizing a halftone screen corresponding to the selected color separation.

14. The method of claim 11, further comprising: calculating a gamma response curve to calibrate the scanned image data with the calibration marks, and calculating an adjusted gray level utilizing the gamma response function.

15. The method of claim 7, wherein a complimentary color plane is isolated to calculate the corresponding color level.

16. The method of claim 7, wherein calculating coverage comprises calculating an average gray level for each color separation.

17. The method of claim 7, further comprising calculating approximate toner usage, wherein toner usage=(sum of adjusted pixel values for the scanned printed page)/(number of pixels on scanned printed page).

18. The method of claim 7, wherein calculating toner coverage value comprises compensating for toner waste.

19. A system for estimated toner coverage on a printed page, comprising:
a printing apparatus;
an image reading apparatus;
wherein the printing apparatus is configured to generate color separations for an image to be printed, and wherein the color separations correspond to the available toner colors, and further wherein the printing apparatus is configured to print each color separation on a separate page;
and wherein the image reading apparatus is configured to scan each printed color separation and calculate toner coverage.

20. The system of claim 19, wherein the image reading apparatus generates an image file corresponding to each scanned color separation and the image file is stored on a computer readable medium.

21. A computer program code product, comprising a computer readable medium having computer readable code embodied therein capable of controlling a single or multi-toner printer for estimating toner coverage on a printed page, comprising:
a code portion configured to send instructions to receive image data to be printed;
a code portion configured to convert the received image data to a contone bitmap;
a code portion configured to generate color plane contone bitmaps corresponding to each toner color in the contone bitmap;
a code portion configured to calculate pixel coverage values for each of the generated color plane contone bitmaps;
a code portion configured to render bitmaps at device resolution and bitdepth with an appropriate halftone screen corresponding to available toner colors for the received image data;
a code portion configured to copy the calculated pixel coverage values onto the rendered bitmaps; and
a code portion configured to print the rendered bitmaps to generate a printed page, wherein the printed page includes the calculated pixel coverage values.

22. The computer program code product of claim 21, wherein the code portion configured to calculate pixel coverage values further comprises compensating for toner waste.

23. A computer program code product, comprising a computer readable medium having computer readable code embodied therein capable of controlling a single or multi-toner printer for estimating toner coverage on a printed page, comprising:
a code portion configured to send instructions to receive image data to be printed;
a code portion configured to convert the received image data to a contone bitmap;
a code portion configured to generate color plane contone bitmaps corresponding to each toner color in the contone bitmap;
a code portion configured to print each color plane contone bitmap on a separate page;
a code portion configured to scan each printed page comprising the color plane contone bitmap; and
a code portion configured to calculate pixel coverage values for each of the scanned printed pages.

24. The computer program product of claim 23, wherein the code portion configured to calculate pixel coverage values further comprises compensating for toner waste.

* * * * *